US011471839B2

(12) United States Patent
Dong et al.

(10) Patent No.: US 11,471,839 B2
(45) Date of Patent: Oct. 18, 2022

(54) HIGH SELECTIVITY MEMBRANES FOR HYDROGEN SULFIDE AND CARBON DIOXIDE REMOVAL FROM NATURAL GAS

(71) Applicant: UOP LLC, Des Plaines, IL (US)

(72) Inventors: Xueliang Dong, Schaumburg, IL (US); Chunqing Liu, Arlington Heights, IL (US); Howie Tran, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 386 days.

(21) Appl. No.: 16/533,297

(22) Filed: Aug. 6, 2019

(65) Prior Publication Data

US 2021/0039052 A1 Feb. 11, 2021

(51) Int. Cl.
| | | |
|---|---|---|
| *B01D 53/22* | (2006.01) | |
| *B01D 69/12* | (2006.01) | |
| *B01D 71/80* | (2006.01) | |
| *B01D 71/56* | (2006.01) | |
| *B01D 71/52* | (2006.01) | |
| *B01D 69/10* | (2006.01) | |
| *C10L 3/10* | (2006.01) | |
| *B01D 69/02* | (2006.01) | |

(52) U.S. Cl.
CPC ......... *B01D 69/125* (2013.01); *B01D 53/226* (2013.01); *B01D 53/228* (2013.01); *B01D 69/02* (2013.01); *B01D 69/105* (2013.01); *B01D 71/52* (2013.01); *B01D 71/56* (2013.01); *B01D 71/80* (2013.01); *C10L 3/103* (2013.01); *C10L 3/104* (2013.01); *B01D 2325/022* (2013.01); *C10L 2290/548* (2013.01)

(58) Field of Classification Search
CPC .. B01D 69/02; B01D 2325/022; B01D 71/80; B01D 53/228; B01D 69/125; B01D 53/226; B01D 71/52; B01D 71/56; B01D 69/105; C10L 2290/548; C10L 3/104; C10L 3/103
See application file for complete search history.

(56) References Cited

U.S. PATENT DOCUMENTS

| | | | |
|---|---|---|---|
| 3,758,603 A | 9/1973 | Steigelmann | |
| 4,561,864 A | 12/1985 | Klass et al. | |
| 4,963,165 A | 10/1990 | Blume et al. | |
| 9,216,390 B2 | 12/2015 | Ho | |
| 10,471,381 B2 | 11/2019 | Liu et al. | |
| 2003/0170308 A1* | 9/2003 | Cleary | A61K 8/73 424/487 |
| 2004/0242770 A1* | 12/2004 | Feldstein | C09J 131/04 525/54.3 |
| 2007/0129172 A1* | 6/2007 | Cavallaro | A63B 37/12 473/371 |
| 2008/0146445 A1* | 6/2008 | De Kerpel | A01N 37/06 504/100 |
| 2010/0100116 A1* | 4/2010 | Brister | A61F 5/0036 606/192 |
| 2010/0170776 A1* | 7/2010 | Ehrenberg | B01D 63/085 202/168 |
| 2010/0249946 A1* | 9/2010 | Lesh | A61F 2/0059 623/23.72 |
| 2011/0039468 A1* | 2/2011 | Baldwin, Jr. | B32B 27/20 442/381 |
| 2016/0282326 A1* | 9/2016 | Waduge | C23C 16/26 |
| 2017/0189534 A1* | 7/2017 | Lee | A61K 9/7084 |
| 2017/0354918 A1* | 12/2017 | Liu | B01D 69/142 |
| 2018/0030213 A1* | 2/2018 | Johnson | C07F 3/06 |
| 2018/0038001 A1* | 2/2018 | Waduge | C01B 32/186 |
| 2018/0161373 A1* | 6/2018 | Lunyak | C12N 5/0667 |
| 2018/0369454 A1* | 12/2018 | Mannarino | C08K 3/22 |

FOREIGN PATENT DOCUMENTS

| | | |
|---|---|---|
| GB | 1478083 | 6/1997 |
| WO | 2009002747 A2 | 12/2008 |

OTHER PUBLICATIONS

PCT Search Report and Written Opinion dated Oct. 22, 2020 in application PCT/US2020/042842.
Riley et al., "Thin-Film Composite Membrane for Single-Stage Seawater Desalination by Reverse Osmosis", Applied Polymer Symposium No. 22, pp. 255-267 (1973)—copy previously submtted.
Riley et al., "Thin-Film Composite Membrane for Single-Stage Seawater Desalination by Reverse Osmosis", Applied Polymer Sympoium No. 22, pp. 255-267 (1973).
"International Preliminary Report on Patentability for H214281-WO", dated Feb. 17, 2022.

* cited by examiner

*Primary Examiner* — Anthony R Shumate
(74) *Attorney, Agent, or Firm* — Paschall & Associates, LLC; Mark Goldberg

(57) ABSTRACT

A thin film composite gas separation membrane comprising a polyether block amide copolymer coating layer and a nanoporous asymmetric support membrane with nanopores on the skin layer surface of the support membrane and gelatin polymers inside the nanopores on the skin layer surface of the support membrane. A method for making the thin film composite gas separation membrane is provided as well as the use of the membrane for a variety of separations such as separations of hydrogen sulfide and carbon dioxide from natural gas, carbon dioxide removal from flue gas, fuel gas conditioning, hydrogen/methane, polar molecules, and ammonia mixtures with methane, nitrogen or hydrogen and other light gases separations, but also for natural gas liquids recovery and hydrogen sulfide and carbon dioxide removal from natural gas in a single step.

4 Claims, No Drawings

HIGH SELECTIVITY MEMBRANES FOR HYDROGEN SULFIDE AND CARBON DIOXIDE REMOVAL FROM NATURAL GAS

BACKGROUND OF THE INVENTION

Membrane-based technologies have advantages of both low capital cost and high-energy efficiency compared to conventional separation methods. Polymeric membranes have proven to operate successfully in industrial gas separations such as in the separation of nitrogen from air and the separation of carbon dioxide from natural gas. Numerous research articles and patents describe polymeric membrane materials (e.g., polyimides, polysulfones, polycarbonates, polyethers, polyamides, polyarylates, polypyrrolones) with desirable gas separation properties, particularly for use in oxygen/nitrogen separation. Polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The relative ability of a membrane to achieve the desired separation is referred to as the separation factor or selectivity for the given mixture. There are, however, several other obstacles to use a polymeric membrane to achieve a separation under any sort of large scale or commercial conditions. One such obstacle is permeation rate or flux. One of the components to be separated must have a sufficiently high permeation rate at the preferred conditions or extraordinarily large membrane surface areas are required to allow separation of large amounts of material. Therefore, commercially available polymer membranes, such as CA, polyimide, and polysulfone membranes formed by phase inversion and solvent exchange methods have an asymmetric integrally skinned membrane structure. See U.S. Pat. No. 3,133,132. Such membranes are characterized by a thin, dense, selectively semipermeable surface "skin" and a less dense void-containing (or porous), non-selective support region, with pore sizes ranging from large in the support region to very small proximate to the "skin". Such membranes have a serious shortcoming in that, in operation, the permeation rate and/or selectivity is reduced to unacceptable levels over time. This can occur for several reasons. One reason for the decrease of permeation rate has been attributed to a collapse of some of the pores near the skinned surface of the membrane, resulting in an undue densification of the surface skin. One attempt at overcoming this problem has been the development of thin film composite (or TFC) membranes, comprising a thin selective skin deposited on a resilient porous support. See, for example, "Thin-Film Composite Membrane for Single-Stage Seawater Desalination by Reverse Osmosis" by R. L. Riley et al., Applied Polymer Symposium No. 22, pages 255-267 (1973). TFC membranes can be formed from cellulose acetate, polysulfone, polyethersulfone, polyamide, polyimide, polyetherimide, cellulose nitrate, polyurethane, polycarbonate, polystyrene, etc. While TFC membranes are less susceptible to flux decline than phase inversion-type membranes, fabrication of TFC membranes that are free from leaks is difficult, and fabrication requires multiple steps and so is generally more complex and costlier. Another reason for the reduced permeation rate and/or selectivity over time is that impurities present in the mixture can over time clog the pores, if present, or interstitial spaces in the polymer. Yet another reason is that one or more components of the mixture can alter the form or structure of the polymer membrane over time thus changing its permeation rate and/or selectivity. One specific way this can happen is if one or more components of the mixture cause plasticization of the polymer membrane. Plasticization occurs when one or more of the components of the mixture act as a solvent in the polymer often causing it to swell and lose its membrane properties. It has been found that polymers such as cellulose acetate and polyimides which have particularly good separation factors for separation of mixtures comprising $CO_2$, $H_2S$, and $CH_4$ are prone to plasticization over time thus resulting in decreasing performance of these membranes.

Cellulose acetate (CA) commercial spiral wound and hollow fiber membranes have been used extensively for natural gas upgrading. However, CA membranes still need improvement in several properties including selectivity, performance durability, chemical stability, resistance to hydrocarbon contaminants, resistance to solvent swelling, and resistance to plasticization. Natural gas often contains substantial amounts of acid gases such as carbon dioxide ($CO_2$) and hydrogen sulfide ($H_2S$). The acid gas removal capabilities of CA membranes are affected by the concentrations of $CO_2$ and $H_2S$ in the feed. In addition, traditional glassy polymeric membranes have $H_2S/CO_2$ selectivity close to 1, therefore, it is difficult to remove $H_2S$ down to much lower concentration than $CO_2$ concentration from natural gas to meet the pipeline gas specifications for $H_2S$. Therefore, new membranes with much higher $H_2S$/natural gas selectivities than $CO_2$/natural gas selectivities are needed for the removal of both $H_2S$ and $CO_2$ impurities from natural gas.

GB 1,478,083 disclosed a method of removing $H_2S$ and $CO_2$ from natural gas using a membrane having selective permeability for both $H_2S$ and $CO_2$. GB 1,478,083 showed dense film permeation data for Nylon 6, Nylon 6,6, polyvinyl alcohol, polyacrylonitrile, and gelatin. Gelatin dense film showed the highest selectivity for $H_2S/CH_4$ of 200 among all these polymers. However, the $H_2S$ permeability of gelatin is extremely low of 0.0069 Barrer. The gelatin material with extremely low $H_2S$ permeability will show very low membrane permeance if a membrane comprising a continuous gelatin selective layer is prepared, which will not result in a commercially viable membrane product for $H_2S$ removal from natural gas. Therefore, no successful high permeance and high selectivity gelatin-based membranes for $H_2S$ removal from natural gas have been reported in the literature. U.S. Pat. No. 4,561,864 disclosed a gelatin material plasticized with glycerin for $H_2S$ and $CO_2$ removal from natural gas. However, the stability of glycerin plasticizer under high feed pressure is questionable. U.S. Pat. No. 4,963,165 reported a composite membrane comprising a microporous support membrane and a thin layer of rubbery polyamide-polyether block copolymer for $H_2S$ removal from natural gas.

New robust membranes with stable high performance for simultaneous $H_2S$ and $CO_2$ removal from natural gas are desired. It is desirable for a gas separation membrane to have a high permeation rate to gases and a high selectivity for the higher permeation rate gas over the lower permeation rate gas, which means that the selective layer of the membrane should be as thin as possible and defect free. The use of gelatin-nipped nanoporous support membrane for the preparation of high permeance and high selectivity thin film composite membranes for simultaneous $H_2S$ and $CO_2$

SUMMARY OF THE INVENTION

A thin film composite (TFC) gas separation membrane is disclosed that comprises a polyether block amide copolymer coating layer and a nanoporous asymmetric support membrane with nanopores on the skin layer surface of the support membrane and gelatin polymers inside the nanopores on the skin layer surface of the support membrane. The nanoporous asymmetric support membrane with nanopores on the skin layer surface of the support membrane can be made from any polymeric membrane materials such as polysulfone, polyethersulfone, polyacrylonitrile, polyimide, polyetherimide, cellulose acetate, cellulose triacetate, and mixtures thereof. The gelatin polymers with super high intrinsic $H_2S/CH_4$ selectivity inside the nanopores on the skin layer surface of the support membrane not only further improve $H_2S/CH_4$ selectivity of the TFC gas separation membrane, but also further reduce the pore sizes of the nanopores on the skin layer surface of the support membrane, which prevents the penetration of the polyether block amide copolymer into the nanopores during coating. Therefore, a thin coating layer of the polyether block amide copolymer on the surface of the nanoporous asymmetric support membrane with gelatin polymers inside the nanopores on the skin layer surface of the support membrane can be formed and the resulting new TFC gas separation membrane shows high permeance. The incorporation of the gelatin polymer with super high intrinsic $H_2S/CH_4$ selectivity but super low $H_2S$ permeability into the nanopores on the skin layer surface of the support membrane rather than forming a continuous gelatin coating layer on the surface of the support membrane improves the $H_2S/CH_4$ selectivity of the resulting TFC membrane without significant reduction of $H_2S$ permeance. The thin polyether block amide copolymer coating layer provides the TFC gas separation membrane high permeance and high selectivity and can be formed from any polyether block amide copolymer that is soluble in organic solvent or a mixture of organic solvent and water.

The new TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane have the advantages of low cost, high permeances (or fluxes) for both $H_2S$ and $CO_2$, high selectivities for both $H_2S/CH_4$ and $CO_2/CH_4$, as well as stable permeance (or flux) and sustained selectivity over time for acid gases removal from natural gas.

The nanoporous asymmetric support membrane with nanopores on the skin layer surface of the support membrane and gelatin polymers inside the nanopores on the skin layer surface that are described have a $CO_2$ permeance ($P_{CO_2}/L$) of ≥2,000 GPU and a $CO_2/CH_4$ selectivity ($\alpha_{CO_2/CH_4}$) of ≤1 at 50° C. under 50 psig, 10% $CO_2$/90% $CH_4$ mixed gas feed pressure. The TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane can have a $H_2S$ permeance ($P_{H_2S}/L$) of 100-1,500 GPU, a $P_{CO_2}/L$ of 50-350 GPU, a $H_2S/CH_4$ selectivity ($\alpha_{H_2S/CH_4}$) of 15-70, and a $\alpha_{CO_2/CH_4}$ of 5-30, and at 50° C. under 1000 psig, 50 ppm-35% $H_2S$/10% $CO_2$/balanced $CH_4$ mixed gas feed pressure.

There is also disclosed a method of making the TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane. The method involves the design and fabrication of a nanoporous asymmetric support membrane with nanopores on the skin layer surface of the support membrane and gelatin polymers inside the nanopores on the skin layer surface of the support membrane to improve the $H_2S/CH_4$ selectivity of the resulting TFC membrane. Gelatin polymer was incorporated into the nanopores on the skin layer surface of the support membrane via an aqueous gelatin solution nipping method. The polyether block amide copolymer was then coated on the skin layer surface of the nanoporous asymmetric support membrane.

A process of using the TFC gas separation membrane is provided where the membrane comprises a polyether block amide copolymer coating layer and a nanoporous asymmetric support membrane with nanopores on the skin layer surface of the support membrane and gelatin polymers inside the nanopores on the skin layer surface of the support membrane for gas separations, particularly for natural gas upgrading applications to remove $CO_2$ and $H_2S$ impurities such as off-shore gas-processing platforms, floating liquefied natural gas (FLNG), and floating, processing, storage and offloading (FPSO) vessel applications. The invention provides a process for separating at least one gas from a mixture of gases using the TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane, the process comprising: (a) providing a TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane which is permeable to the at least one gas; (b) contacting the mixture on one side of the membrane to cause the at least one gas to permeate the membrane; and (c) removing from the opposite side of the membrane a permeate gas composition comprising a portion of the at least one gas which permeated the membrane.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid to be economically successful.

Membranes for gas separations have evolved rapidly in the past 25 years due to their easy processability for scale-up and low energy requirements. Membrane gas separation is of special interest to petroleum producers and refiners, chemical companies, and industrial gas suppliers. Several applications of membrane gas separation have achieved commercial success, including carbon dioxide removal from natural gas and biogas and in enhanced oil recovery.

The membranes most commonly used in commercial gas separation applications are polymeric membranes comprising a thin, dense, selectively semipermeable layer and a less dense porous, void-containing, non-selective support layer. Gas separation by these membranes is based on a solution-diffusion mechanism. This mechanism involves molecular-scale interactions of the permeating gas with the membrane polymer. This mechanism assumes that each component is sorbed by the membrane at one interface, transported by diffusion across the membrane through the voids between the polymeric chains (or called free volume), and desorbed at the other interface. According to the solution-diffusion model, the membrane performance for a given pair of gases (e.g., $CO_2/CH_4$, $H_2S/CH_4$, $O_2/N_2$, $H_2/CH_4$) is determined by two parameters: permeability coefficient ($P_A$) and the selectivity ($\alpha_{A/B}$). The $P_A$ is the product of the gas flux and the membrane selective layer thickness, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficient because of a high solubility coefficient, a high diffusion coefficient, or both. The diffusion coefficient decreases, and the solubility coefficient increases with the increase in the molecular size of the gas. For high-performance polymer membranes, both high permeability and selectivity are desirable because higher permeability decreases the size of the membrane area required to treat a given amount of gas, thereby decreasing the capital cost of membrane units, and because higher selectivity results in a higher purity product gas with increased efficiency. However, polymeric gas separation membrane materials still have the issues of high cost, low selectivity, low permeance, poor hydrocarbon contaminant resistance, poor plasticization resistance, low chemical and thermal stability, unstable permeance (or flux) and selectivity over time, and poor processability to form a defect-free thin selective skin layer.

This invention relates to a TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane. In addition, this invention relates to a method for making the TFC gas separation membrane as well as the application of the membrane for a variety of gas separations such as separations of $H_2S$ and $CO_2$ from natural gas, $CO_2$ removal from flue gas, fuel gas conditioning, $H_2/CH_4$, polar molecules such as $H_2O$, $H_2S$, and $NH_3$/mixtures with $CH_4$, $N_2$, $H_2$, and other light gases separations, but also for NGL recovery and $H_2S$ and $CO_2$ removal from natural gas in a single step.

The TFC gas separation membrane described in the present invention comprises a polyether block amide copolymer coating layer and a nanoporous asymmetric support membrane with nanopores on the skin layer surface of the support membrane and gelatin polymers inside the nanopores on the skin layer surface of the support membrane. The gelatin polymers with super high intrinsic $H_2S/CH_4$ selectivity inside the nanopores on the skin layer surface of the support membrane not only further improve $H_2S/CH_4$ selectivity of the TFC gas separation membrane, but also further reduce the pore sizes of the nanopores on the skin layer surface of the support membrane, which prevents the penetration of the polyether block amide copolymer into the nanopores during coating. Therefore, a thin coating layer of the polyether block amide copolymer on the surface of the nanoporous asymmetric support membrane with gelatin polymers inside the nanopores on the skin layer surface of the support membrane can be formed and the resulting new TFC gas separation membrane shows high permeance. The incorporation of the gelatin polymer with super high intrinsic $H_2S/CH_4$ selectivity but super low $H_2S$ permeability into the nanopores on the skin layer surface of the support membrane rather than forming a continuous gelatin coating layer on the surface of the support membrane improves the $H_2S/CH_4$ selectivity of the resulting TFC membrane without significant reduction of $H_2S$ permeance. The thin polyether block amide copolymer coating layer provides the TFC gas separation membrane high permeance and high selectivity and can be formed from any polyether block amide copolymer that is soluble in organic solvent or a mixture of organic solvent and water.

The new TFC gas separation membrane with either flat sheet or hollow fiber geometry described in the current invention provides low cost, high permeances (or fluxes) for both $H_2S$ and $CO_2$, and high selectivities for both $H_2S/CH_4$ and $CO_2/CH_4$. The new TFC gas separation membrane described in the current invention also provides essentially no loss in selectivity or no loss in flux rates over a typical operating period in the presence of $H_2S$ and $CO_2$. The term "essentially no loss in flux rates" means that the flux declines less than about 30%, and more particularly the flux rate declines less than 20% over a typical operating period of about 3 years.

The nanoporous asymmetric support membrane with nanopores on the skin layer surface of the support membrane and gelatin polymers inside the nanopores on the skin layer surface of the support membrane described in the current invention has an average pore diameter of less than 50 nm on the membrane skin layer surface. The nanoporous asymmetric support membrane described in the current invention can have either flat sheet (spiral wound) or hollow fiber geometry. The nanoporous asymmetric support membrane described in the current invention can be formed by phase inversion followed by gelatin nipping and direct air drying or can be formed by phase inversion followed by gelatin nipping and solvent exchange. Design of the nanoporous asymmetric support membrane is based on the desired properties such as heat resistance, solvent resistance, and mechanical strength of the support membrane, as well as other factors dictated by the operating conditions for selective permeation. The polyether block amide copolymer coating and the nanoporous asymmetric support membrane with gelatin polymers nipped inside the nanopores on the skin layer surface of the support membrane need to have the prerequisite relative separation factors in accordance with the invention for at least one pair of gases. The nanoporous asymmetric support membrane with gelatin polymers nipped inside the nanopores on the skin layer surface of the support membrane not only provides essentially all the structural support for the membrane which can provide little, if any, resistance to the passage of gases, but also prevents the penetration of the polyether block amide copolymer into the nanopores during coating. In addition, the gelatin polymer with super high intrinsic $H_2S/CH_4$ selectivity but super low H$_2$S permeability in the nanopores on the skin layer surface of the support membrane improves the H$_2$S/CH$_4$ selectivity of the resulting TFC membrane without significant reduction of H$_2$S permeance.

Generally, the nanoporous asymmetric support membrane described in the current invention can be made from any polymeric membrane materials such as polysulfone, polyethersulfone, polyacrylonitrile, polyimide, polyetherimide, polyether ether ketone, cellulose acetate, cellulose triacetate, and mixtures thereof. These polymers provide a range of properties such as low cost, high permeance, good mechanical stability, and ease of processability that are important for gas separations. Typical polymers that are used can be substituted or unsubstituted polymers and may be selected from but is not limited to, polysulfones; sulfonated polysulfones; polyethersulfones; sulfonated polyethersulfones; polyethers; polyacrylonitrile; polyetherimides; polycarbonates; cellulosic polymers such as cellulose acetate, cellulose triacetate, cellulose acetate-butyrate, cellulose propionate, ethyl cellulose, methyl cellulose, nitrocellulose; polyether ether ketone; polyimides; polyamide/imides; polyketones, polyether ketones; poly(arylene oxides) such as poly(phenylene oxide) and poly(xylene oxide); polyurethanes; poly(benzobenzimidazole)s; polybenzoxazoles; and mixtures of thereof. Some preferred polymers that are suitable for the preparation of the nanoporous asymmetric support membrane described in the current invention include, but are not limited to polyethersulfones, polyacrylonitrile, polyetherimides, cellulosic polymers such as cellulose acetate and cellulose triacetate, polyimides, and mixtures thereof.

The solvents used for dissolving the polymer material for the preparation of the nanoporous asymmetric support membrane described in the current invention are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents include most amide solvents that are typically used for the formation of the nanoporous asymmetric support membrane described in the current invention, such as N-methylpyrrolidone (NMP) and N,N-dimethyl acetamide (DMAc), N,N-dimethylformamide (DMF), dimethyl sulfoxide (DMSO), methylene chloride, tetrahydrofuran (THF), acetone, methyl acetate, isopropanol, n-octane, n-hexane, n-decane, methanol, ethanol, glycerol, lactic acid, citric acid, dioxanes, 1,3-dioxolane, mixtures thereof, others known to those skilled in the art and mixtures thereof.

Gelatin polymer was selected as the "nipping" polymer inside the nanopores on the skin layer surface of the support membrane mainly because it has super high intrinsic H$_2$S/CH$_4$ selectivity. The incorporation of the gelatin polymer into the nanopores on the skin layer surface of the support membrane is accomplished by nipping of an aqueous solution of gelatin with a concentration in a range of 0.01 wt % to 1 wt % at the end of the membrane casting or spinning fabrication process or via the addition of gelatin polymer to the gelation water tank during the membrane casting or spinning fabrication process. The incorporation of the gelatin polymer with super high intrinsic H$_2$S/CH$_4$ selectivity but super low H$_2$S permeability into the nanopores on the skin layer surface of the support membrane rather than forming a continuous gelatin coating layer on the surface of the support membrane improves the H$_2$S/CH$_4$ selectivity of the resulting TFC membrane without significant reduction of H$_2$S permeance. The gelatin polymer inside the nanopores on the skin layer surface of the support membrane not only further improves H$_2$S/CH$_4$ selectivity of the TFC gas separation membrane, but also further reduces the pore sizes of the nanopores on the skin layer surface of the support membrane, which prevents the penetration of the polyether block amide copolymer into the nanopores during coating. Gelatin is a heterogeneous mixture of water-soluble proteins. The proteins are extracted by boiling skin, tendons, ligaments, bones, etc. in water. There are two types of gelatins, type A and type B. Type A gelatin is derived from acid-cured tissue and Type B gelatin is derived from lime-cured tissue. Either type A or type B gelatin can be used in the present invention and preferably type A gelatin is used for the preparation of the nanoporous asymmetric support membrane with gelatin inside the nanopores on the skin layer surface of the support membrane.

The polyether block amide copolymer thin coating on the surface of the nanoporous asymmetric support membrane with gelatin polymers inside the nanopores on the skin layer surface of the support membrane described in the present invention can be formed from any polyether block amide copolymer that is soluble in organic solvent or a mixture of organic solvent and water. The polyether block amide copolymer used in the present invention comprises a polyamide segment and a polyether segment. Preferably, the polyamide segment in the polyether block amide copolymer is a saturated aliphatic polyamide segment. More preferably, the polyether block amide copolymer used in the current invention is a thermoplastic elastomer selected from Pebax® manufactured by Arkema such as Pebax 2533, 3533, 4033, 5533, 6333, Pebax MEI 1657, or Pebax MV 1074 and VESTAMID® E manufactured by Evonik Industries. The polyether block amide copolymer is synthesized by polycondensation of a carboxylic acid terminated polyamide such as nylon 6, nylon 12 or nylon 11 and an alcohol terminated polyether such as polytetramethylene glycol or polyethylene oxide. The polyether block amide copolymer used in the current invention has high intrinsic H$_2$S/CH$_4$ selectivity and H$_2$S permeability. The solvents that can be used for dissolving the polyether block amide copolymer in the present invention are essentially alcohols such as ethanol, n-propanol, iso-propanol, n-butanol, 2-butanol, iso-butanol, tert-butanol or a mixture of water and the alcohol. It is preferred that the polyether block amide copolymer is dissolved in n-butanol at 50-100° C. with a concentration of from about 0.2 to about 5 wt % to provide an effective polyether block amide copolymer coating.

The present invention also discloses a method of making the TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane. The method involves the design and fabrication of a nanoporous asymmetric support membrane with nanopores on the skin layer surface of the support membrane and gelatin polymers inside the nanopores on the skin layer surface of the support membrane to improve the H$_2$S/CH$_4$ selectivity of the resulting TFC membrane. Gelatin polymer was incorporated into the nanopores on the skin layer surface of the support membrane via nipping of an aqueous solution of gelatin with a concentration in a range of 0.01 wt % to 1 wt % at the end of the membrane casting or spinning fabrication process or via the addition of gelatin polymer to the gelation water tank during the membrane casting or spinning fabrication process. The polyether block amide copolymer was then coated on the skin layer surface of the nanoporous asymmetric support membrane.

The present invention discloses a new method of making the nanoporous asymmetric support membrane with nanopores on the skin layer surface of the support membrane and gelatin polymers inside the nanopores on the skin layer surface of the support membrane either in a flat sheet form or a hollow fiber form. The method comprises: a) casting or spinning a membrane casting or spinning dope to form a wet nanoporous asymmetric flat sheet or hollow fiber support membrane via a phase inversion membrane casting or spinning fabrication process, wherein the membrane casting dope was cast on a highly porous non-selective fabric backing such as a highly porous non-selective symmetric woven Nylon 6,6 fabric backing to form the wet nanoporous asymmetric flat sheet support membrane; b) nipping an aqueous solution of gelatin with a concentration in a range of 0.01 wt % to 1 wt % at the end of the membrane casting or spinning fabrication process or via the addition of gelatin polymer to the gelation water tank during the membrane casting or spinning fabrication process to incorporate high $H_2S/CH_4$ selectivity gelatin polymers into the nanopores on the skin layer surface of the support membrane; c) drying the wet nanoporous asymmetric support membrane with gelatin inside the nanopores the skin layer surface of the support membrane through a direct air drying method or through a solvent exchange method to form a dried nanoporous asymmetric support membrane with gelatin inside the nanopores the skin layer surface of the support membrane; d) coating a thin, nonporous, polyether block amide copolymer continuous layer on the skin layer surface of the dried nanoporous asymmetric support membrane via dip-coating, meniscus coating, spin coating, casting, soaking, spraying, painting, or other known conventional solution coating technologies using a solution of the polyether block amide copolymer comprising about 0.2 to about 5 wt % of polyether block amide copolymer and an alcohol solvent or a solvent mixture of an alcohol and water; e) drying the polyether block amide copolymer coated nanoporous asymmetric support membrane at about 50 to 100° C. to form the thin film composite (TFC) gas separation membrane comprising a polyether block amide copolymer coating layer and a nanoporous asymmetric support membrane with nanopores on the skin layer surface of the support membrane and gelatin polymers inside the nanopores on the skin layer surface of the support membrane.

The membrane casting or spinning dope in the present invention comprises a polymer dissolved in a mixture of organic solvents or two or more blend polymers dissolved in a mixture of organic solvents. For example, the nanoporous asymmetric support membrane can be a thin nanoporous asymmetric polyethersulfone or polyacrylonitrile support membrane having a skin layer thickness of less than about 10,000 angstroms. Preferably, the thin nanoporous asymmetric polyethersulfone or polyacrylonitrile support membrane has a skin layer thickness between about 200 and about 1000 angstroms, and more preferably, the thin nanoporous asymmetric polyethersulfone or polyacrylonitrile support membrane has a skin layer thickness between about 300 and about 500 angstroms. The concentration of the aqueous gelatin solution in the current invention is dependent upon the initial porosity of the nanoporous asymmetric support membrane. The dried nanoporous asymmetric support membrane with gelatin inside the nanopores the skin layer surface of the support membrane has an average pore diameter of less than 50 nm on the membrane skin layer surface. The dried nanoporous asymmetric support membrane with nanopores on the skin layer surface of the support membrane and gelatin polymers inside the nanopores on the skin layer surface described in the present invention can have a $CO_2$ permeance ($P_{CO2}/L$) of $\geq 2,000$ GPU and a $CO_2/CH_4$ selectivity ($\alpha_{CO2/CH4}$) of $\leq 1$ at 50° C. under 50 psig, 10% $CO_2$/90% $CH_4$ mixed gas feed pressure. The TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane can have a $H_2S$ permeance ($P_{H2S}/L$) of 100-1,500 GPU, a $P_{CO2}/L$ of 50-350 GPU, a $H_2S/CH_4$ selectivity ($\alpha_{H2S/CH4}$) of 15-70, and a $\alpha_{CO2/CH4}$ of 5-30, and at 50° C. under 1000 psig, 50 ppm-35% $H_2S$/10% $CO_2$/balanced $CH_4$ mixed gas feed pressure.

The invention also provides a process for separating at least one gas from a mixture of gases using the TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane, the process comprising: (a) providing the TFC gas separation membrane which is permeable to the at least one gas; (b) contacting the mixture on one side of the membrane to cause the at least one gas to permeate the membrane; and (c) removing from the opposite side of the membrane a permeate gas composition comprising a portion of the at least one gas which permeated said membrane.

The simplest membrane processing scheme for the TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane described in the present invention is a one-stage flow scheme. For the one-stage flow scheme, a natural gas feed comprising $CO_2$ and $H_2S$ impurities is separated into a hydrocarbon-rich, low $CO_2$ and $H_2S$ residual product stream and a $CO_2$ and $H_2S$ rich permeate stream by the TFC gas separation membrane in the present invention. High hydrocarbon recovery (>95%) can be achieved using a two-stage or multi-stage flow scheme where the low pressure, first-stage permeate is compressed and processed in a second-stage membrane. The TFC gas separation membrane in the present invention can be used for the first stage membrane, the second stage membrane, or both the first stage and the second stage membranes. Another membrane processing scheme is a two-step flow scheme where the residue from the first membrane comprising low $H_2S$ content is sent to the second membrane to further remove $CO_2$ and the permeate from the second membrane can be compressed and sent back to the first membrane feed. For the two-step membrane process, the TFC gas separation membrane in the present invention can be used as the first step membrane and a high $CO_2$ permeance and high $CO_2/CH_4$ selectivity glassy polymer membrane can be used as the second step membrane.

The TFC gas separation membrane comprising a polyether block amide copolymer coating layer and a nanoporous asymmetric support membrane with nanopores on the skin layer surface of the support membrane and gelatin polymers inside the nanopores on the skin layer surface of the support membrane are especially useful in the purification, separation or adsorption of species in the liquid or gas phase. In addition to separation of pairs of gases, these new TFC gas separation membranes may, for example, be used for natural gas liquid (NGL) recovery and $CO_2$ removal from natural gas in one-step, fuel gas conditioning to separate methane from C2 and C2+ hydrocarbons, as well as natural gas upgrading applications to remove $H_2S$ and $CO_2$ from natural gas such as FLNG and FPSO applications.

The TFC gas separation membrane of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ and $H_2S$ from natural gas, $H_2$ from $N_2$, $CH_4$, and Ar in ammonia purge gas streams, $H_2$ recovery in refineries, fuel gas conditioning, and iso/normal paraffin separations. Any given pair or group of gases that differ in molecular size, for example nitrogen and oxygen, carbon dioxide and methane, hydrogen and methane or carbon monoxide, helium and methane, can be separated using the TFC gas separation membrane described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the TFC gas separation membrane of the present invention will range from about −50° to about 100° C. More preferably, the effective operating temperature of the TFC gas separation membrane of the present invention will range from about −20° to about 70° C., and most preferably, the effective operating temperature of the TFC gas separation membrane of the present invention will be less than about 70° C.

EXAMPLES

The following examples are provided to illustrate one or more preferred embodiments of the invention, but are not limited embodiments thereof. Numerous variations can be made to the following examples that lie within the scope of the invention.

Example 1

Preparation of Gelatin-Nipped and then Pebax MV 1074-Coated PES TFC Membrane (Abbreviated as "G500-P1074-PES")

A nanoporous asymmetric polyethersulfone (PES) support membrane with nanopores on the skin layer surface of the support membrane and gelatin polymers inside the nanopores on the skin layer surface having a $CO_2/CH_4$ selectivity of <1 and a $CO_2$ permeance of about 3950 GPU (50° C., 50 psig, 10% $CO_2$/90% $CH_4$) was prepared from a PES casting dope comprising PES polymer, N-methyl pyrrolidone and 1,3-dioxolane solvents, and a mixture of glycerol and n-decane non-solvents. A film was cast on a highly porous non-selective symmetric woven Nylon 6,6 fabric backing then gelled by immersion in a 1° C. water bath for about 10 minutes, and then annealed in a hot water bath at 80° to 90° C. for about 15 minutes to form a wet nanoporous asymmetric PES-32 support membrane. A 500-ppm aqueous gelatin nipping solution was dripped onto the skin layer surface of the wet nanoporous asymmetric PES support membrane on the winder under tension at the end of the membrane casting to form a wet nanoporous asymmetric PES flat sheet support membrane with nanopores on the skin layer surface of the support membrane and gelatin polymers inside the nanopores on the skin layer surface. The wet nanoporous asymmetric PES flat sheet support membrane was dried with a continuous drying machine at 70° C. at 1.3 fpm. The dried nanoporous asymmetric PES support membrane with nanopores on the skin layer surface of the support membrane and gelatin polymers inside the nanopores on the skin layer surface was dip coated with a 1 wt % Pebax MV 1074 polymer solution in n-butanol solvent and dried at 85° C. for 1 h to form the dried gelatin-nipped and then Pebax MV 1074-coated PES TFC membrane (abbreviated as "G500-P1074-PES").

Example 2

Preparation of Gelatin-Nipped and then Pebax MV 1074-Coated PES TFC Membrane (Abbreviated as "G1000-P1074-PES")

A gelatin-nipped and then Pebax MV 1074-coated PES TFC membrane (abbreviated as "G1000-P1074-PES") was prepared using the procedure same as that in Example 1 except that a 1000 ppm aqueous gelatin nipping solution instead of a 500-ppm aqueous gelatin nipping solution was used.

Example 3

Preparation of Gelatin-Nipped and then Pebax MV 1074-Coated PES TFC Membrane (Abbreviated as "G2000-P1074-PES")

A gelatin-nipped and then Pebax MV 1074-coated PES TFC membrane (abbreviated as "G2000-P1074-PES") was prepared using the procedure same as that in Example 1 except that a 2000 ppm aqueous gelatin nipping solution instead of a 500-ppm aqueous gelatin nipping solution was used.

Example 4

Preparation of Gelatin-Nipped and then Pebax MV 1074-Coated PAN TFC Membrane (Abbreviated as "G1000-P1074-PAN")

A nanoporous asymmetric polyacrylonitrile (PAN) flat sheet support membrane with nanopores on the skin layer surface of the support membrane and gelatin polymers inside the nanopores on the skin layer surface having a $N_2$ permeance of about 17,780 GPU (50° C., 50 psig, single gas $N_2$) was prepared from a PAN casting dope comprising PAN polymer, dimethylformamide (DMF) solvent, and n-decane non-solvent. A film was cast on a highly porous non-selective symmetric woven Nylon 6,6 fabric backing then gelled by immersion in a 20° to 25° C. water bath for about 10 minutes, and then annealed in a hot water bath at 70° to 75° C. for about 15 minutes to form a wet nanoporous asymmetric PAN support membrane. A 1000-ppm aqueous gelatin nipping solution was dripped onto the skin layer surface of the wet nanoporous asymmetric PAN support membrane on the winder under tension at the end of the membrane casting to form a wet nanoporous asymmetric PAN flat sheet support membrane with nanopores on the skin layer surface of the support membrane and gelatin polymers inside the nanopores on the skin layer surface. The wet nanoporous asymmetric PAN flat sheet support membrane was dried with a continuous drying machine at 70° C. at 1.2 fpm. The dried nanoporous asymmetric PAN support membrane with nanopores on the skin layer surface of the support membrane and gelatin polymers inside the nanopores on the skin layer surface was meniscus coated continuously with a 1.5 wt % Pebax MV 1074 polymer solution in n-butanol solvent and dried at 70° to 80° C. to form the dried gelatin-nipped and then Pebax MV 1074-coated PAN TFC membrane (abbreviated as "G1000-P1074-PAN").

Comparative Example 1

Preparation of Pebax MV 1074-Coated PES TFC Membrane (Abbreviated as "P1074-PES")

A Pebax MV 1074-coated PES TFC membrane (abbreviated as "P1074-PES") was prepared using a procedure like that described in Example 1 except that no aqueous gelatin nipping solution was used for nipping and the nanoporous PES support membrane has no gelatin polymer inside the nanopores on the skin layer surface of the support membrane.

Comparative Example 2

Preparation of Hyaluronic Acid-Nipped and then Pebax MV 1074-Coated PES TFC Membrane (Abbreviated as "HA1000-P1074-PES")

A hyaluronic acid-nipped and then Pebax MV 1074-coated PES TFC membrane (abbreviated as "HA1000-P1074-PES") was prepared using a procedure like that described in Example 1 except that a 1000-ppm aqueous hyaluronic acid nipping solution was dripped onto the skin layer surface of the wet nanoporous asymmetric PES support membrane on the winder under tension at the end of the membrane casting to form a wet nanoporous asymmetric PES support membrane with nanopores on the skin layer surface of the support membrane and hyaluronic acid polymers inside the nanopores on the skin layer surface of the support membrane.

Comparative Example 3

Preparation of Sodium Alginate-Nipped and then Pebax MV 1074-Coated PES TFC Membrane (Abbreviated as "Na-A1000-P1074-PES")

A sodium alginate-nipped and then Pebax MV 1074-coated PES TFC membrane (abbreviated as "Na-A1000-P1074-PES") was prepared using a procedure like that described in Example 1 except that a 1000-ppm aqueous sodium alginate nipping solution was dripped onto the skin layer surface of the wet nanoporous asymmetric PES support membrane on the winder under tension at the end of the membrane casting to form a wet nanoporous asymmetric PES support membrane with nanopores on the skin layer surface of the support membrane and sodium alginate polymers inside the nanopores on the skin layer surface of the support membrane.

Example 5

$H_2S/CH_4$ and $CO_2/CH_4$ Separation Performances of G500-P1074-PES, G1000-P1074-PES, G2000-P1074-PES, G1000-P1074-PAN, P1074-PES, HA1000-P1074-PES, Na-A1000-P1074-PES membranes 76 mm (3 inch) diameter circles of G500-P1074-PES membrane prepared in Example 1, G1000-P1074-PES membrane prepared in Example 2, G2000-P1074-PES prepared in Example 3, G1000-P1074-PAN prepared in Example 4, P1074-PES prepared in comparative Example 1, HA1000-P1074-PES prepared in comparative Example 2, and Na-A1000-P1074-PES membrane prepared in comparative Example 3 in the present invention were evaluated for gas transport properties using a natural gas feed containing 300 ppm $H_2S$, 10% $CO_2$ and balanced with $CH_4$ at a feed pressure of 6996 kPa (1000 psig) at 50° C. as shown in Table 1. The results in Table 1 show that all the gelatin-nipped and then Pebax MV 1074-coated PES or gelatin-nipped and then Pebax MV 1074-coated PAN TFC membranes (G500-P1074-PES, G1000-P1074-PES, G2000-P1074-PES, and G1000-P1074-PAN) showed much higher $H_2S$ permeances and much higher $H_2S/CH_4$ selectivities than those of the comparative membranes without gelatin nipping (P1074-PES) or with hyaluronic acid or sodium alginate water soluble polymer-nipped and then Pebax MV 1074-coated PES TFC membranes (HA1000-P1074-PES and Na-A1000-P1074-PES), demonstrating that gelatin polymers with super high intrinsic $H_2S/CH_4$ selectivity inside the nanopores on the skin layer surface of the PES support membranes enhanced $H_2S/CH_4$ selectivity of the Pebax MV 1074-coated PES TFC gas separation membranes. The results in Table 1 also show that G1000-P1074-PAN TFC membrane has lower $H_2S/CH_4$ selectivity but much higher $H_2S$ permeance than G1000-P1074-PES TFC membrane.

TABLE 1

$H_2S/CH_4$ and $CO_2/CH_4$ separation performance of G500-P1074-PES, G1000-P1074-PES, G2000-P1074-PES, G1000-P1074-PAN, P1074-PES, HA1000-P1074-PES, Na-A1000-P1074-PES membranes [a]

| TFC Membrane | $P_{H2S}/L$ (GPU) [b] | $\alpha_{H2S/CH4}$ | $P_{CO2}/L$ (GPU) [b] | $\alpha_{CO2/CH4}$ |
|---|---|---|---|---|
| G500-P1074-PES | 162.1 | 49.2 | 52.4 | 15.9 |
| G1000-P1074-PES | 181.1 | 56.6 | 60.8 | 19.0 |
| G2000-P1074-PES | 191.7 | 65.9 | 57.3 | 19.7 |
| G1000-P1074-PAN | 762.8 | 32.5 | 194.8 | 8.27 |
| P1074-PES | 111.2 | 27.8 | 54.8 | 13.7 |
| HA1000-P1074-PES | 74.4 | 28.9 | 45.8 | 17.8 |
| Na-A1000-P1074-PES | 82.1 | 28.5 | 52.4 | 18.2 |

[a] Tested at 50° C. under 6996 kPa (1000 psig), 300 ppm$H_2S$/10% $CO_2$/balanced with $CH_4$ mixed gas pressure.
[b] 1 GPU = $2.7 \times 10^{-5}$ $m^3$ (STP)/$m^2 \cdot h \cdot kPa$.

Example 6

CO$_2$/CH$_4$ Separation Performance Stability of G1000-P1074-PES Membrane

A 76 mm (3 inch) diameter circle of G1000-P1074-PES membrane of Example 2 was evaluated for gas transport properties for 24 h of continuous testing using a natural gas feed containing 10% CO$_2$ and 90% CH$_4$ at a feed pressure of 6996 kPa (1000 psig) at 50° C. Table 2 shows $P_{CO2}$/L and $\alpha_{CO2/CH4}$ of G1000-P1074-PES membrane of the present invention for a 24 h of permeation test. It can be seen from Table 2 that G1000-P1074-PES membrane has $P_{CO2}$/L of 61.4 GPU and $\alpha_{CO2/CH4}$ of 19.1 after 1 h of permeation in the presence of 10% CO$_2$/90% CH$_4$ feed under 1000 psig feed pressure. The membrane showed very stable performance with <5% drop in CO$_2$ permeance and no drop in CO$_2$/CH$_4$ selectivity after 24 h of permeation testing.

TABLE 2

Summary of CO$_2$/CH$_4$ separation performance stability tests on G1000-P1074-PES membrane [a]

| G1000-P1074-PES Membrane | $P_{CO2}$/L (GPU) [b] | $\alpha_{CO2/CH4}$ |
|---|---|---|
| 1 h performance | 61.4 | 19.1 |
| 2 h performance | 61.2 | 19.1 |
| 5 h performance | 60.6 | 19.1 |
| 20 h performance | 58.7 | 19.2 |
| 22 h performance | 58.8 | 19.2 |
| 24 h performance | 58.8 | 19.2 |

[a] Tested at 50° C. under 6996 kPa (1000 psig), 10% CO$_2$/90% CH$_4$ mixed gas pressure.
[b] 1 GPU = 2.7 × 10$^{-5}$ m$^3$ (STP)/m$^2$ · h · kPa.

Example 7

CO$_2$/CH$_4$ Separation Performance Stability of G1000-P1074-PAN Membrane

A 76 mm (3 inch) diameter circle of G1000-P1074-PAN membrane of Example 4 was evaluated for gas transport properties for 52 h of continuous testing using a natural gas feed containing 10% CO$_2$ and 90% CH$_4$ at a feed pressure of 6996 kPa (1000 psig) at 50° C. Table 3 shows $P_{CO2}$/L and $\alpha_{CO2/CH4}$ of G1000-P1074-PAN membrane of the present invention for a 52 h of permeation test. It can be seen from Table 3 that G1000-P1074-PAN membrane has $P_{CO2}$/L of 194.8 GPU and $\alpha_{CO2/CH4}$ of 8.27 after 1 h of permeation in the presence of 10% CO$_2$/90% CH$_4$ feed under 1000 psig feed pressure. The membrane showed very stable performance without CO$_2$ permeance and CO$_2$/CH$_4$ selectivity drop after 52 h of permeation testing.

TABLE 3

Summary of CO$_2$/CH$_4$ separation performance stability tests on G1000-P1074-PAN membrane [a]

| G1000-P1074-PAN Membrane | $P_{CO2}$/L (GPU) [b] | $\alpha_{CO2/CH4}$ |
|---|---|---|
| 1 h performance | 194.8 | 8.27 |
| 2.2 h performance | 196.4 | 8.26 |
| 4 h performance | 196.4 | 8.26 |
| 24.2 h performance | 196.4 | 8.26 |
| 52 h performance | 196.4 | 8.26 |

[a] Tested at 50° C. under 6996 kPa (1000 psig), 10% CO$_2$/90% CH$_4$ mixed gas pressure.
[b] 1 GPU = 2.7 × 10$^{-5}$ m$^3$ (STP)/m$^2$ · h · kPa.

Specific Embodiments

While the following is described in conjunction with specific embodiments, it will be understood that this description is intended to illustrate and not limit the scope of the preceding description and the appended claims.

A first embodiment of the invention is a thin film composite gas separation membrane comprising a polyether block amide polymer coating layer and a nanoporous asymmetric support membrane with nanopores on a skin layer surface of the support membrane and gelatin polymers inside nanopores on the skin layer surface of the support membrane. An embodiment of the invention is one, any or all of prior embodiments in this paragraph up through the first embodiment in this paragraph wherein the nanoporous asymmetric support membrane comprises a polymeric membrane material selected from polysulfone, polyethersulfone, polyacrylonitrile, polyimide, polyetherimide, cellulose acetate, cellulose triacetate, and mixtures thereof. An embodiment of the invention is one, any or all of prior embodiments in this paragraph up through the first embodiment in this paragraph wherein the gelatin polymer is a Type A gelatin derived from acid-cured tissue or a Type B gelatin derived from lime-cured tissue. An embodiment of the invention is one, any or all of prior embodiments in this paragraph up through the first embodiment in this paragraph wherein the polyether block amide copolymer comprises a polyamide segment and a polyether segment. An embodiment of the invention is one, any or all of prior embodiments in this paragraph up through the first embodiment in this paragraph wherein the polyamide segment is a saturated aliphatic polyamide segment.

A second embodiment of the invention is a method of making a thin film composite gas separation membrane comprising a polyether block amide copolymer coating layer and a nanoporous asymmetric support membrane with nanopores on a skin layer surface of the support membrane and gelatin polymers inside nanopores on the skin layer surface of the support membrane comprising a) casting or spinning a membrane casting or a spinning dope to form a wet nanoporous asymmetric flat sheet or hollow fiber support membrane via a phase inversion membrane casting or spinning fabrication process; b) nipping an aqueous solution of gelatin with a concentration in a range of 0.01 wt % to 1 wt % at the end of the membrane casting or spinning fabrication process or via the addition of gelatin polymer to a gelation water tank during the membrane casting or spinning fabrication process to incorporate high H$_2$S/CH$_4$ selectivity gelatin polymers into the nanopores on the skin layer surface of the support membrane; c) drying the wet nanoporous asymmetric flat sheet or hollow fiber support membrane with gelatin inside the nanopores on the skin layer surface of the support membrane through a direct air drying method or through a solvent exchange method to form a dried nanoporous asymmetric support membrane with gelatin inside the nanopores on the skin layer surface of the support membrane; d) coating a thin, nonporous, polyether block amide copolymer layer on the skin layer surface of the dried nanoporous asymmetric support membrane via using a solution of the polyether block amide copolymer comprising about 0.2 to about 5 wt % of polyether block amide copolymer and an alcohol solvent or a solvent mixture of an alcohol and water; and e) drying the polyether block amide copolymer coated nanoporous asymmetric support membrane at about 50 to 100° C. to form the thin film composite gas separation membrane. An embodiment of the invention is one, any or all of prior embodiments in this paragraph up through the first embodiment in this paragraph wherein the polyether block amide copolymer layer is deposited on the dried nanoporous asymmetric support membrane via dip-coating, meniscus coating, spin coating, casting, soaking, spraying, or painting. An embodiment of the invention is one, any or all of prior embodiments in this paragraph up through the first embodiment in this paragraph wherein the nanoporous asymmetric support flat sheet or hollow fiber membrane comprises a polymeric membrane material selected from polysulfone, polyethersulfone, polyacrylonitrile, polyimide, polyetherimide, cellulose acetate, cellulose triacetate, and mixtures thereof. An embodiment of the invention is one, any or all of prior embodiments in this paragraph up through the first embodiment in this paragraph wherein the gelatin polymer is a Type A gelatin derived from acid-cured tissue or a Type B gelatin derived from lime-cured tissue.

A third embodiment of the invention is a process for separating at least one gas from a mixture of gases using a thin film composite gas separation membrane, the process comprising (a) providing the thin film composite gas separation membrane which is permeable to the at least one gas; (b) contacting the mixture on one side of the membrane to cause the at least one gas to permeate the membrane; and (c) removing from the opposite side of the membrane a permeate gas composition comprising a portion of the at least one gas which permeated the membrane, wherein the thin film composite gas separation membrane comprises a polyether block amide copolymer coating layer on a nanoporous asymmetric support membrane with nanopores on a skin layer surface of the support membrane and gelatin polymers inside nanopores on the skin layer surface of the support membrane. An embodiment of the invention is one, any or all of prior embodiments in this paragraph up through the second embodiment in this paragraph wherein the process is a one-stage flow scheme. An embodiment of the invention is one, any or all of prior embodiments in this paragraph up through the second embodiment in this paragraph wherein the process is a two-step process wherein a residue stream from a first membrane containing a low hydrogen sulfide content is sent to a second membrane to further remove carbon dioxide. An embodiment of the invention is one, any or all of prior embodiments in this paragraph up through the second embodiment in this paragraph wherein a permeate from the second membrane is compressed and sent back to a first membrane feed to the first membrane. An embodiment of the invention is one, any or all of prior embodiments in this paragraph up through the second embodiment in this paragraph wherein the first membrane is the thin film composite gas separation membrane and the second membrane is a high CO2/CH4 selectivity glassy polymer membrane. An embodiment of the invention is one, any or all of prior embodiments in this paragraph up through the second embodiment in this paragraph wherein the gases comprise methane, C2 and C2+ hydrocarbons. An embodiment of the invention is one, any or all of prior embodiments in this paragraph up through the second embodiment in this paragraph wherein the gases comprise hydrogen sulfide and carbon dioxide in natural gas. An embodiment of the invention is one, any or all of prior embodiments in this paragraph up through the second embodiment in this paragraph wherein the process is a two-stage process wherein the low pressure, first-stage permeate is compressed and processed in a second-stage membrane. An embodiment of the invention is one, any or all of prior embodiments in this paragraph up through the second embodiment in this paragraph wherein the first stage membrane, the second stage membrane, or both the first stage and the second stage membranes are the thin film composite gas separation membrane.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A thin film composite gas separation membrane comprising a polyether block amide copolymer coating layer and a nanoporous asymmetric polyacrylonitrile support membrane with nanopores on a skin layer surface of the support membrane and gelatin polymers inside nanopores on the skin layer surface of the support membrane.

2. The thin film composite gas separation membrane of claim 1 wherein said gelatin polymer is a Type A gelatin derived from acid-cured tissue or a Type B gelatin derived from lime-cured tissue.

3. The thin film composite gas separation membrane of claim 1 wherein said polyether block amide copolymer comprises a polyamide segment and a polyether segment.

4. The thin film composite gas separation membrane of claim 3 wherein said polyamide segment is a saturated aliphatic polyamide segment.

* * * * *